United States Patent Office 3,627,487
Patented Dec. 14, 1971

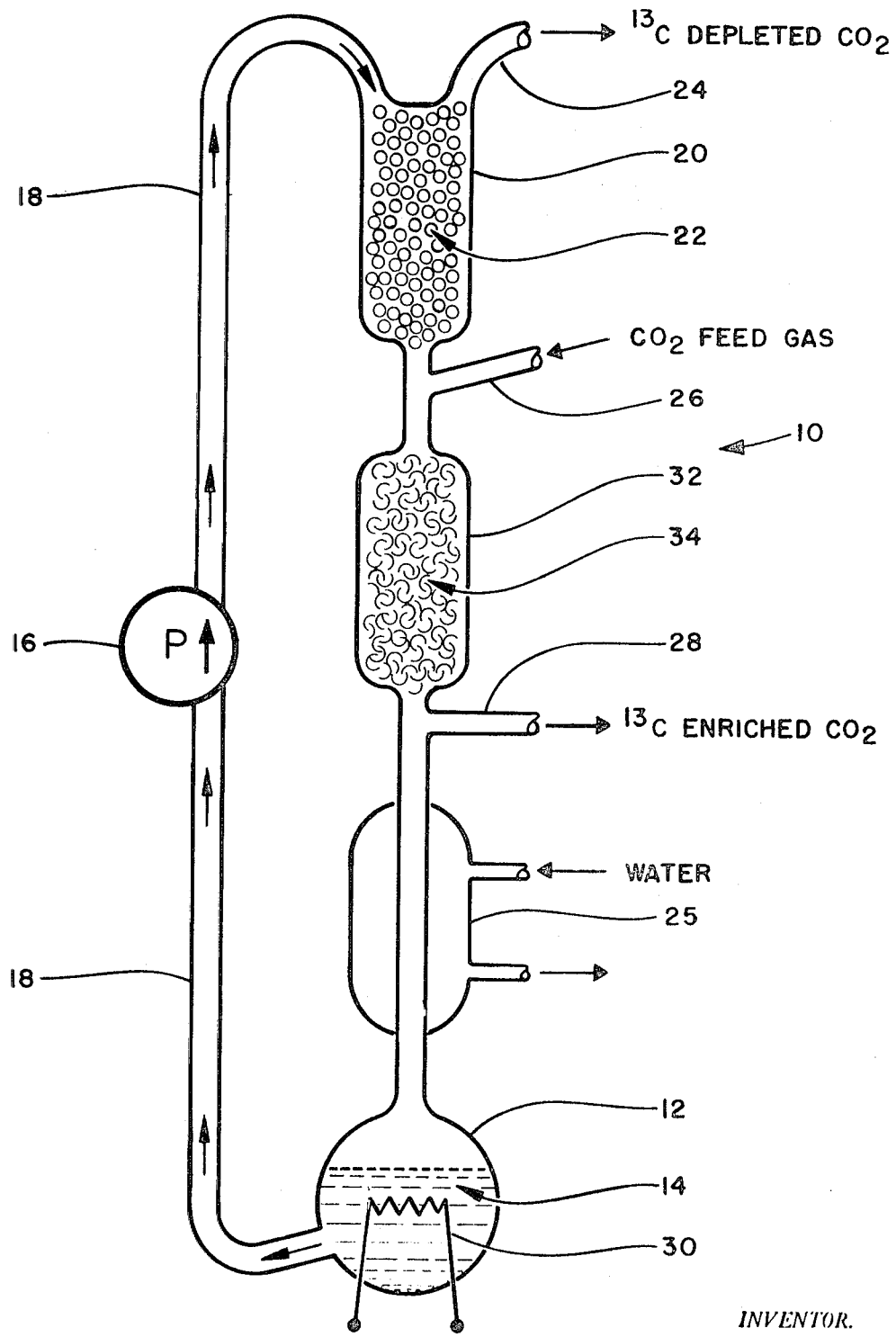

3,627,487
PROCESS FOR ENRICHING CARBON-13
Bernhart E. Jepson, Dayton, Ohio, assignor to the United
States of America as represented by the United States
Atomic Energy Commission
Filed Oct. 22, 1969, Ser. No. 868,494
Int. Cl. C01b *31/00, 31/20;* C09k *3/00*
U.S. Cl. 23—150                     5 Claims

ABSTRACT OF THE DISCLOSURE

A process for enriching carbon-13 isotope in carbon dioxide in which carbon dioxide feed gas is reacted with an isobutylamine and isopropanol solution to form a carbamate solution therewith and then the carbamate is decomposed from the solution to form carbon-13 enriched carbon dioxide.

BACKGROUND OF INVENTION

The isotope carbon-13 normally occurs in nature with carbon-12 at a ratio of about 1.11 to 98.89 respectively. Carbon-13, because of its physical properties may be used in such applications as spectroscopy, accelerator targets and biological investigations. For these uses, it is desirable that the relative quantity of carbon-13 in natural carbon be enriched from 1.11% to some higher level such as about 95% or even higher. In achieving this enrichment it is also desirable that the process proceed at a fast rate with low cost.

Carbon-13 enrichment may be obtained by various chemical exchange processes including exchanges between HCN and NaCN, $CO_2$ and aqueous solutions of bicarbonates and $CO_2$ and various amines.

With these latter chemical exchange processes, the amines are dissolved in suitable solvents. Typical amine-solvent systems include monoethanolamine-isopropanol, methoxypropylamine - isopropanol and isobutylamine-methanol, the particular components being selected with the amine boiling point above the solvent to insure a low concentration of amine in the vapor phase of the decomposer. These systems may achieve separation factors of about 1.4 to 3.2 with separative powers of about 0.5 to 0.8 (for the apparatus described later).

The separation factor is defined by the formula $$S_{eq} = \frac{[13_C/12_C] \text{ product}}{[13_C/12_C] \text{ waste}}$$

while the separative power is defined by the formula $$\Delta U = H \ln S_{eq}$$

where:

$\Delta U$ is the separative power in moles/cm.-min.,
H is $(\alpha-1)L$,
$\alpha$ is the dimensionless simple process factor and
L is interstage flow in moles per day of $CO_2$.

In any of these processes, it is desirable to achieve the greatest possible separative power to provide the most economical enrichment. These prior processes are limited as to the separation power which they may achieve and are consequently very costly.

SUMMARY OF INVENTION

In view of the limitations of the prior art, it is a purpose of this invention to provide a chemical exchange process for enrichment of carbon-13 having a high separative power.

It is a further purpose of this invention to provide a more economical process for enrichment of carbon-13.

Various other objects and advantages will appear from the following description of the invention, and the most novel features will be particularly pointed out hereinafter in connection with the appended claims.

The invention comprises reacting carbon dioxide feed gas with isobutylamine and isopropanol solution to form a carbamate solution, decomposing the carbamate from the solution to carbon-13 enriched carbon dioxide and recovering said enriched carbon dioxide.

DESCRIPTION OF DRAWING

The sole figure in the drawing illustrates a typical reaction column for the process of this invention.

DETAILED DESCRIPTION

Apparatus to perform the present process may comprise the reaction of column 10 shown in the drawing. This reaction column 10 includes a flask-like bottle or container 12 at the bottom of column 10 which may be partially or completely filled with an initial starting amine-solvent solution 14 of isobutylamine and isopropanol. The interior of container 12 may be connected and the solution transported by suitable pump 16 and piping 18 to a first reaction vessel 20 at the top of column 10. Reaction vessel 20 may have an appropriate filler 22, such as glass or ceramic beads or other inert packing material, disposed therein to increase the surface area of the isobutylamine-isopropanol solution contacting the carbon dioxide and enhance the reaction. A suitable open or valved vent pipe 24 may be coupled to the top of column 10 and reaction vessel 20, as shown, to release carbon-13 depleted carbon dioxide gas from the column. The bottom of reaction vessel 20 may be coupled through a suitable water or otherwise cooled reflux vapor condenser 25 to container 12.

Carbon dioxide feed gas may be fed into column 10 below reaction vessel 20 through a suitable valved inlet pipe 26 and carbon-13 enriched carbon dioxide recovered or removed therefrom at a location below inlet pipe 26 and above condenser 24, such as by suitably valved outlet pipe 28. Outlet pipe 28 in turn may be connected to the inlet pipe of one or more additional staged or cascaded reaction columns like column 10 or to a suitable carbon dioxide storage vessel for later processing to carbon-13 enriched carbon.

The reacted solution from reaction vessel 20 is thus collected in container 12. The carbamate in this solution may be decomposed by heating the solution with an internal heater 30, or by any other appropriate electric or other heater, to vaporize the solution. Carbon-13 enriched carbon dioxide gas may be driven off from the solution and removed by outlet pipe 28 and the isobutylamine-isopropanol reflux vapors condensed by condenser 25 and returned to vessel 12 for further recycling by pump 16.

Further enrichment may be achieved by also refluxing a portion of the enriched carbon dioxide gas released upon decomposition of the carbamate through a second reaction vessel 32 disposed between inlet and outlet pipes 26 and 28. Reaction vessel 32 may be filled with an appropriate filler or packing material, like reaction vessel 20, such as with suitable beads or stainless steel helices 34. The partially enriched carbon dioxide gas may react with the carbamate containing solution from reaction vessel 20 to produce a further enriched carbamate and consequently, upon decomposition, a further enriched carbon dioxide gas.

The process, in more detail, may be performed in the reaction column 10 disposing an isobutylamine-isopropanol solution 14 in container 12 and pumping solution 14 to the top of the column. The solution may then flow down through reaction vessel 20. As the solution flows over beads 22, carbon dioxide feed gas from inlet pipe 26 flows up through vessel 20 contacting and reacting with the isobutylamine in the solution to form a carbamate herewith by the following reaction:

Since the amine preferentially reacts with carbon-13 dioxide, a greater percentage of carbon-13 dioxide reacts with the amine than carbon-12 dioxide and thus partially depletes the carbon dioxide feed gas of carbon-13 dioxide. The depleted feed gas may then be vented through vent pipe 24.

The carbamate containing solution may then flow through second reaction vessel 32 and condenser 25 into container 12. The carbamate containing solution may be heated to about 70° C. to boil the amine-solvent and carbamate mixture and decompose the carbamate by the following reaction;

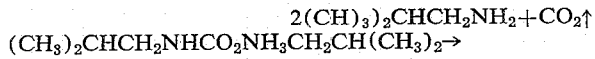

The carbon dioxide thus released is enriched with carbon-13 and may be removed from column 10 through outlet pipe 28 while the vaporized amine solvent is condensed by condenser 25 and returned to container 12.

A portion of the carbon-13 enriched carbon dioxide gas evolved from heating the carbamate containing solution may be refluxed through second reaction vessel 32 to react with unreacted amine-solvent solution and with the carbamate produced in reaction vessel 20. The carbon-13 dioxide in the partially enriched carbon dioxide may replace carbon-12 dioxide in the carbamate and produce additional carbon-13 carbamate for decomposition in container 12. The reflux may thus increase the carbon-13 enrichment of the outlet gas.

Column 10 may be run on a continuous basis removing amine-solvent solution 14 from container 12 simultaneously with decomposing of carbamate flowing from reaction vessel 32 and condenser 25. Reaction vessels 20 and 32 may be operated at room temperature or slightly higher such as from about 20 to 35° C.

Suitable catalysts, such as cupric chloride may be used with the amine-solvent solution to increase the rates of reaction such as at a concentration of about .001 mole per liter of solution. The catalyst may be dissolved directly into the solution or it may be dissolved together with an appropriate absorber like bentonite to increase the quantity of dissolvable catalyst.

The isobutylamine concentration in amine-solvent solution 14 may vary from about 1 to 4 moles per liter solution. With an isobutylamine concentration of about 2.20 to 4.00 moles per liter of solution and an isobutylamine flow rate of about 2 cubic centimeters per square centimeter per minute a separation factor of about 1.85 to 1.65 and separative power of 2.26 to 3.39 moles $CO_2$ per centimeter per minute times $10^{-8}$ with an $\alpha$ of about 1.011.

In a typical operation, about 233 milliliters of isobutylamine may be mixed with about 767 milliliters of isopropanol solvent in a 2-liter container 12 to provide an amine concentration of about 2.28 moles per liter of solution. The amine-solvent solution may be pumped to the top of column 10 via pump 16 and pipe 18 at a flow rate of about 2 cubic centimeters per minute for each square centimeter of reaction vessel 20 area. Carbon dioxide may be passed up through vessel 20 at a flow rate of about 20 cubic centimeters per minute per square centimeter. The carbamate thus formed may be decomposed from container 12 to a temperature of from about 65° to 70° C.

The carbon dioxide feed gas may be initially enriched to about 10 to 50% carbon-13 from a carbon monoxide distillation unit or other conventional enrichment process if such is desired. With a feed gas having about 20% enrichment of carbon-13 dioxide, five 24 feet long columns similar to column 10 may enrich carbon dioxide to about 95% carbon-13 dioxide. With columns of about 0.78 to 12.6 square inches, 2.2 liters of 95% carbon-13 enriched carbon dioxide may be produced per day.

The carbon-13 enriched carbon dioxide may be converted to carbon-13 enriched carbon by any appropriate process. A suitable process may be to reduce the carbon dioxide to carbon monoxide over zinc at about 400° C., disproportionating carbon monoxide to carbon dioxide over an iron catalyst at about 600° C. in the presence of hydrogen and purifying the resulting carbon with HCl at 1100° C. to remove residual iron.

It will be understood that various changes in the steps, details, materials and arrangements of apparatus, which have been herein described and illustrated in order to explain the nature of the invention may be made by those skilled in the art within the principles and scope of the invention.

What is claimed is:

1. A process for enriching carbon-13 in carbon dioxide having a high separative power comprising contacting and reacting carbon dioxide feed gas with an amine-solvent solution of isobutylamine and isopropanol with an amine concentration of from about 1 to 4 moles per liter of solution at a temperature sufficient to form a carbamate therein, heating said amine-solvent and carbamate solution to a temperature sufficient to at least partially decompose the carbamate in the amine-solvent and carbamate solution to carbon-13 enriched carbon dioxide, and recovering the carbon-13 enriched carbon dioxide.

2. The process of claim 1 wherein said carbamate is decomposed by heating said amine-solvent and carbamate solution to boiling.

3. The process of claim 2 including the step of condensing the isobutylamine and isopropanol vapor from said boiling solution and recycling the condensate to react with said carbon dioxide feed gas.

4. The process of claim 1 including the step of refluxing a portion of said carbon-13 enriched carbon dioxide with said amine-solvent and carbamate solution before decomposing the carbamate to further increase carbon-13 enrichment.

5. The process of claim 1 in which said recovered carbon-13 enriched carbon dioxide is further enriched by repeating said process steps in one or more additional stages.

References Cited
UNITED STATES PATENTS

| | | | |
|---|---|---|---|
| 2,225,155 | 12/1940 | Cheronis | 260—534 |
| 2,574,510 | 11/1951 | Thurston et al. | 260—501.11 |
| 3,131,221 | 4/1964 | Remes et al. | 260—501.11 |

OSCAR R. VERTIZ, Primary Examiner

H. S. MILLER, Assistant Examiner

U.S. Cl. X.R.

23—209.1; 252—301.1 R